United States Patent [19]
Burgdorf et al.

[11] Patent Number: 5,895,207
[45] Date of Patent: Apr. 20, 1999

[54] ELECTRIC MOTOR-PUMP ASSEMBLY

[75] Inventors: Jochen Burgdorf, Offenbach; Peter Volz, Darmstadt; Hans-Dieter Reinartz, Frankfurt am Main; Dieter Dinkel, Eppstein/Ts., all of Germany

[73] Assignee: ITT Automotive Europe, GmbH, Frankfurt am Main, Germany

[21] Appl. No.: 08/545,815

[22] PCT Filed: May 13, 1994

[86] PCT No.: PCT/EP94/01525

§ 371 Date: Jun. 27, 1996

§ 102(e) Date: Jun. 27, 1996

[87] PCT Pub. No.: WO94/27045

PCT Pub. Date: Nov. 24, 1994

[30] Foreign Application Priority Data

| Jun. 17, 1993 | [DE] | Germany | 43 20 005 |
| Sep. 17, 1993 | [DE] | Germany | 43 31 825 |
| Sep. 17, 1993 | [DE] | Germany | 43 31 625 |
| Sep. 17, 1993 | [DE] | Germany | 43 31 626 |

[51] Int. Cl.⁶ ............... F04B 17/00; H02K 7/14; H02K 7/08
[52] U.S. Cl. .................. 417/410.1; 417/415
[58] Field of Search .................. 417/410.1, 415, 417/360, 273

[56] References Cited

U.S. PATENT DOCUMENTS

| 4,551,074 | 11/1985 | Asaka et al. | |
| 5,249,935 | 10/1993 | Burgdorf | 417/415 |
| 5,620,311 | 4/1997 | Wetzel | 417/415 |

FOREIGN PATENT DOCUMENTS

| 1751954 | 8/1968 | Germany. |
| 1947545 | 4/1971 | Germany. |
| 2025621 | 12/1971 | Germany. |
| 2144796 | 3/1973 | Germany. |
| 2360182 | 6/1975 | Germany. |
| 2809390 | 9/1979 | Germany. |
| 3232083 | 3/1984 | Germany. |
| 3331807 | 3/1984 | Germany. |
| 3941442 | 7/1990 | Germany. |
| 4027848 | 3/1992 | Germany. |
| 4110971 | 10/1992 | Germany. |
| 4118950 | 2/1993 | Germany. |
| 4132609 | 4/1993 | Germany. |

OTHER PUBLICATIONS

Search Report of the German Patent Office for Application No. P4315826.9.

English Translation of the Int'l Preliminary Examination Report for Appln PCT/EP94/01525.

*Primary Examiner*—Timothy Thorpe
*Assistant Examiner*—Ted Kim
*Attorney, Agent, or Firm*—J. Gordon Lewis; Thomas N. Twomey

[57] ABSTRACT

An assembly, consisting of a motor and a pump, the motor being arranged in a motor housing and the pump in a pump housing. Both housings can be coupled to each other. The motor housing is provided with a second main bearing. The pump housing is equipped with a pump bearing. During normal operation, the forces acting on the pump eccentric are essentially supported by the main bearing and the pump bearing. The bearing forces are introduced into the pump housing. If the motor housing is not fastened to the pump housing, the rotor shaft is supported by the main bearing and, if necessary, an accessory bearing. Thus the motor can be tested without being connected to the pump housing.

27 Claims, 10 Drawing Sheets

ELECTRIC MOTOR-PUMP ASSEMBLY

This application is a 371 of PCT/EP94/01525 filed May 13, 1994.

TECHNICAL FIELD

The present invention relates to electric motor and pump assemblies, and more particularly relates to such assemblies where the pump is preferably a piston pump the pistons of which are driven by an eccentric of the motor shaft.

BACKGROUND OF THE INVENTION

Electric motors and pump assemblies are generally known, for example, in DE-OS 41 18 950. The assembly described in that patent application is a motor pump assembly. The projecting end of the shaft is not supported so that the pressure forces acting on the pistons of the pump and transferred to the rotor shaft, are supported only by the main bearing. DE-OS 23 60 182 discloses that the end of the shaft projecting from the motor housing is mounted in bearings on both sides of the driving element (main bearing, pump bearing) in order to be able to sufficiently support the forces acting on the driving element.

Applying the arrangement proposed in DE-OS 23 60 182 to the arrangement according to DE-OS 41 18 930, results in an assembly with the disadvantage that the bearings are rigidly connected with the housing of the element to be driven and the function of the electric motor can only be tested when the two housings are connected.

An object of the present invention is therefore to develop the assembly in such a way that the shaft during normal operation is sufficiently supported and that a test operation (test phase) of the electric motor is possible when the housing of the motor is not connected with the housing of the element to be driven (pump housing).

For this reason the main bearing is connected with the motor housing, but abuts in radial direction essentially on the housing of the element to be driven when the two housings are coupled.

This can be achieved, on the one hand, by inserting the main bearing only in part into a recess on the motor housing and inserting it into an opposite recess of the element to be driven when coupling the two housings.

The advantage is that the bearing plate closing the motor housing and supporting the main bearing, can be made of plastic material.

During normal operation the forces acting on the main bearing will be transferred onto the housing of the element to be driven. The forces, during the test operation, are not so high so that it is sufficient when the main bearing is supported by a plastic plate.

The housing can also be provided with a recess opening towards the inside of the housing and accommodating the main bearing. This recess corresponds to a bulge towards the outside which can be inserted into the recess of the housing of the element to be driven. The result is also that the bearing forces are finally supported by the housing of the element to be driven as soon as the two housings are coupled.

An accessory bearing at the bottom of the housing of the electric motor can be provided according to the foreseen utilization.

DE 41 32 609 A1 discloses an electric motor for driving a radial piston pump, the shaft of which is supported in an electric motor housing consisting of two parts. The shaft is supported only in a one-point bearing so that the bearing has to be much larger than the nominal diameter of the shaft in order to receive the bearing forces. The electric connection components of the electric motor are led to the outside via an opening in the bowl-shaped housing of the stator (of the electric motor).

Due to the relatively large bearing, the housing collar of the two-piece housing of the electric motor is considerably longer so that the overall length and the weight cannot be reduced further. A second disadvantage results from the external arrangement of the electric connections which require a careful sealing and fastening.

A further objective of the present invention is therefore to realize an assembly with unlimited operational liability, small and short dimensions as well as low noise level which can be tested with regard to function independently from the input or output unit.

The present invention provides a supporting housing between the bearing of the input or output end of the shaft and the pump housing which fixes the pump bearing sliding on the shaft in a blind-end bore of the supporting housing and accommodates a main bearing on the shaft spaced from the pump bearing so that the force flows between the shaft bearing in the pump housing and the electric motor housing.

It is known that in order to fasten the main bearing securely in the pump housing, very small fitting tolerances must be observed leading to different mounting forces. A further disadvantage is that the fastening aids for the exact positioning of the main bearing in the housing are missing, which are needed for observing the necessary mounting depth of the shaft in the pump housing.

A further objective of the present invention is therefore to develop an electric motor in such a way that the shaft can be supported in a precise manner and is easy to regulate and to mount, by evading the disadvantages mentioned above.

This objective is achieved by providing the bearing plate with an opening the inner diameter of which is smaller than the outer diameter of the main bearing, the bearing plate being arranged between the main bearing and the housing of the electric motor.

A further objective of the present invention is to improve an electric motor in such a way that, by simple means, a low-noise assembly can be realized which has unlimited operational reliability as well as small and short dimensions.

This objective is achieved by providing that the shaft end opposite to the input or output end rotates free from bearing forces, the input or output end of the shaft being supported in the pump housing and mounting a supporting plate (bearing plate) being clamped between the electric motor and the pump housing.

BRIEF DESCRIPTION OF THE DRAWINGS

FIG. 1 shows a section of the motor pump assembly of the present invention. It consists of a motor housing 1 and a pump housing 2 which are connected by screws 3, one of which is shown. A rotor shaft 4 extends through both housings. The motor housing 1 is essentially symmetrical to the rotor shaft 4. The pump housing 2 is a block with several bores containing, among other things, pump pistons 21. Pump housing 2 can also contain valves (which are not represented here) controlling the pressure medium flow resulting from the pump.

Figure 1:
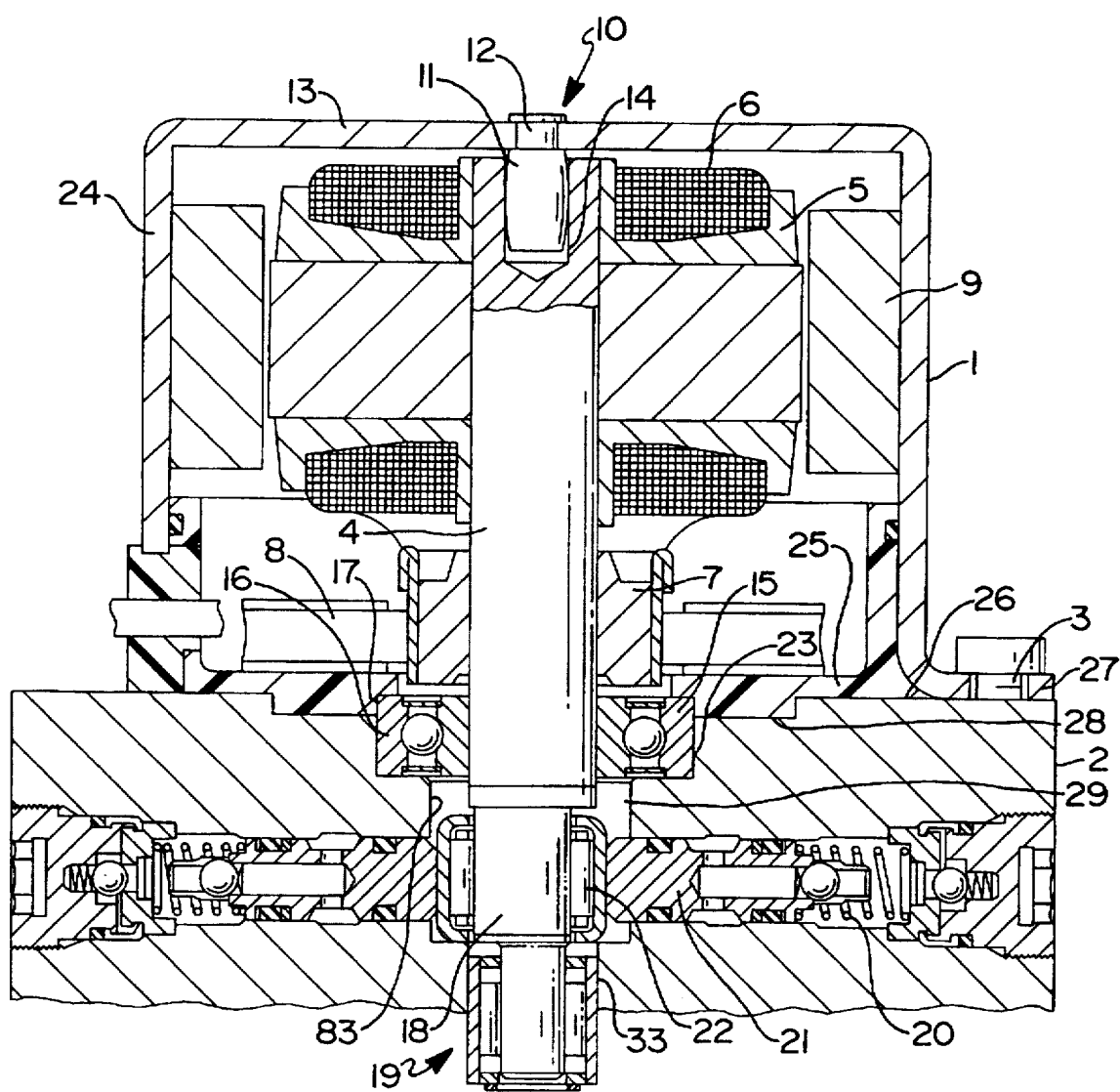
FIG. 1 is a first embodiment of the motor pump assembly of the present invention.

Inside the motor housing 1, the rotor shaft 4 supports a rotor 5 with coils 6. Furthermore, a collector 7 supplies the coils 6 with current. Brushes 8 are in contact with the collector 7. The brushes 8 are fastened to the bearing plate of the motor housing 1, in which permanent magnets 9 are arranged driving the motor in interaction with the magnet fields generated by the coils 6.

The shaft 4 is supported by bearings in three points. The first bearing outer accessory bearing 10 consists of a barrel-shaped journal 11 fastened on the bottom 13 of the motor housing 1 remote from the pump housing 2 by means of a rivet 12. The journal 11 extends axially into the interior of the motor housing 1.

The rotor shaft 4 is provided with a blind-end bore 14 extending axially to rotor shaft 4 and opening towards the front of rotor shaft 4 opposite to the bottom 13. The journal 11 extends into this blind-end bore 14, the outer diameter of journal 11 being slightly smaller than the inner diameter of the blind-end bore 14. Thus a simple accessory bearing 10 has been realized which could be omitted, if necessary.

The pump housing includes an abutment surface 28 into which a bore with a first step 23 for the main bearing 15, a second step 29 with bores 20 for pump pistons 21, and a third step 33 for a pump bearing 19 terminates.

In this embodiment of the present invention, the second bearing or main bearing 15 is realized as a ball bearing. The outer bearing ring 16 of the ball bearing is fitted into a recess 17 of the motor housing 1 or the bearing plate 25. The recess is not very deep so that the bearing 15 projects for the most part of its length from the motor housing 1. The rotor shaft extends through the main bearing 15 to the outside and is equipped with a pump eccentric 18 at the projecting end. Still further outside, the rotor shaft 4 is supported by another bearing (pump bearing 19). In this embodiment of the present invention this bearing is executed as a needle bearing which is inserted completely in a bore of pump housing 2. The forces acting on this bearing are taken up completely by the pump housing.

In the pump housing and transversely to the rotor shaft 4 there are bores 20 accommodating pump pistons 21. As is known, these pump pistons 21 form a pump, together with inlet and outlet valves. The pistons 21 are supported at the pump eccentric 18 of rotor shaft 4 by means of a needle bearing 22. The rotating rotor shaft 4 causes a backward and forward movement of the pistons by means of the pump eccentric 18.

The pump housing is provided with a depression 23 or a first step in the abutment surface 28 opposite to the recess 17 on motor housing 1 when motor housing 1 and pump housing 2 are coupled. The main bearing 15 is retained in the recess 17 or the depression 23, main bearing 2 being inserted for a considerably bigger part of its length in pump housing 2 so that the forces acting on main bearing 15 are taken up essentially by pump housing 2. Thus no significant mechanical stress is induced into the electric motor housing 1.

It is important, however, that the main bearing 15 is connected with motor housing 1. If motor housing 1 and pump housing 2 are separated, main bearing 15 is attached to motor housing 1. Since the forces acting on main bearing 15 are supported, as already described, mainly by the pump housing 2, motor housing 1 can be constructed as follows. It consists of a bowl 24 being open towards pump housing 2 where the motor housing 1 is closed by a bearing plate 25. Since the bearing plate does not have to receive major forces it can be made of plastic material. The bearing plate, too, is formed like a bowl and is inserted into bowl 24 of the motor housing 1 in such a way that the open sides of either element are facing each other. In order to prevent that the bearing plate 25 slips completely into bowl 24 of motor housing 1, it is provided with noses 26 projecting over the inner diameter of bowl 24 of motor housing 1 and which are clamped between a collar 27 on motor housing 1 and the pump housing 2. The screws 3 are inserted into the collar 27 projecting towards the outside and connect motor housing 1 with the abutment surface 28 pump housing 2.

Figure 2:
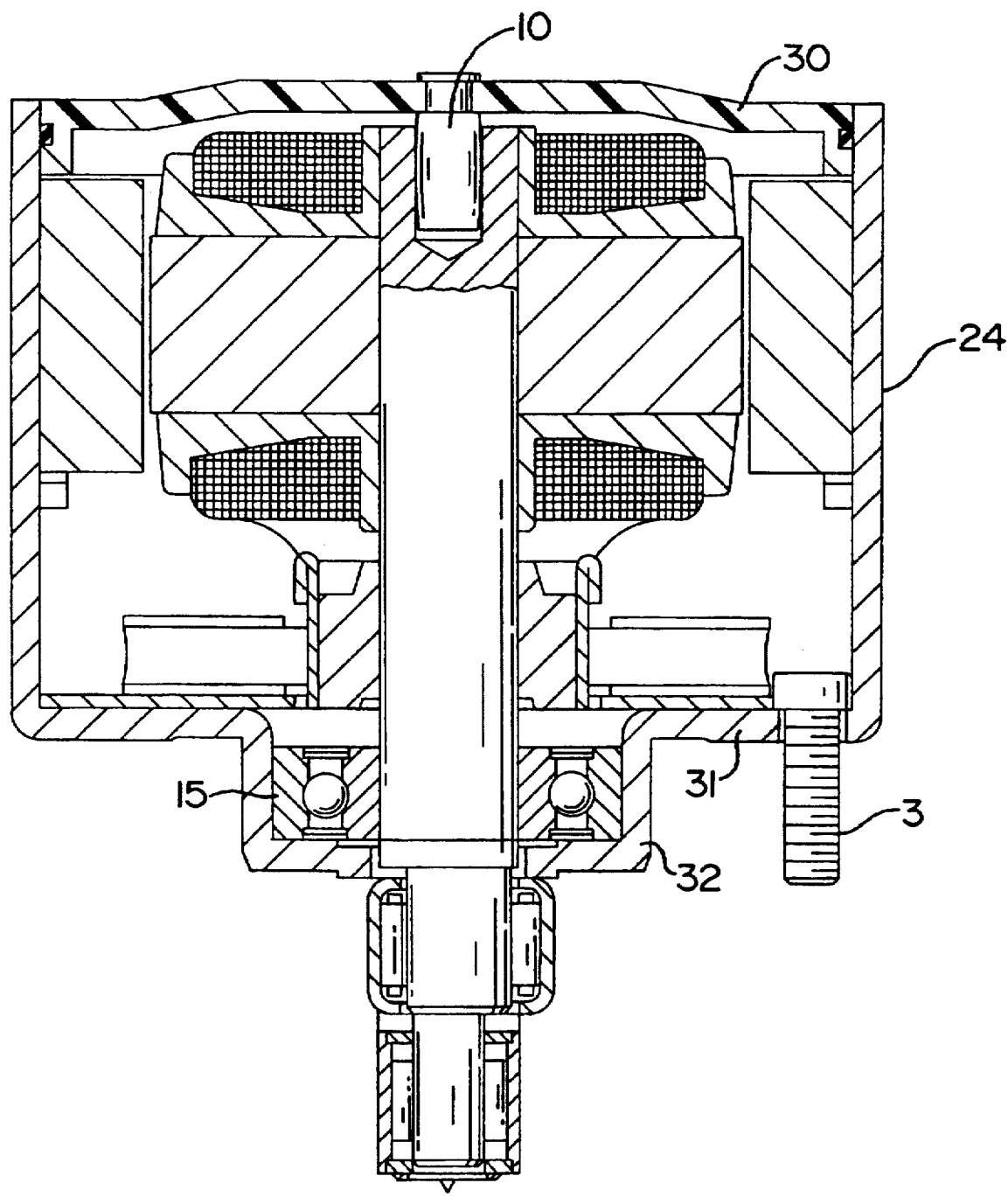
FIG. 2 is a second embodiment of the motor housing of the present invention.

Now referring to FIG. 2, motor housing 1 consists again of a bowl 24 which does not open towards the pump housing 2, however, but away from it. The open side of bowl 24 is closed by a cover 30, the accessory bearing 10 being fixed to the cover 30, if necessary. The bottom 31 of bowl 24 is provided with a bulge 32 extending towards the outside and open to the inside. The diameter of the opening is big enough to accommodate main bearing 15. Since the bulge extends towards the outside it matches with the recesses 23 in pump housing 2, i.e. motor housing 1 with its bulge 32 is inserted into pump housing 2.

Consequently, the forces acting on the main bearing 15 are again supported by pump housing 2. This arrangement has the advantage, that the screws 3 with which the motor housing 1 is fastened to pump housing 2, can be on the inside of motor housing 1. With regard to the other properties, the embodiment according to FIG. 1 corresponds to the embodiment of FIG. 2. The pump housing 2 is arranged according to FIG. 1 and therefore is not described again.

Figure 3:
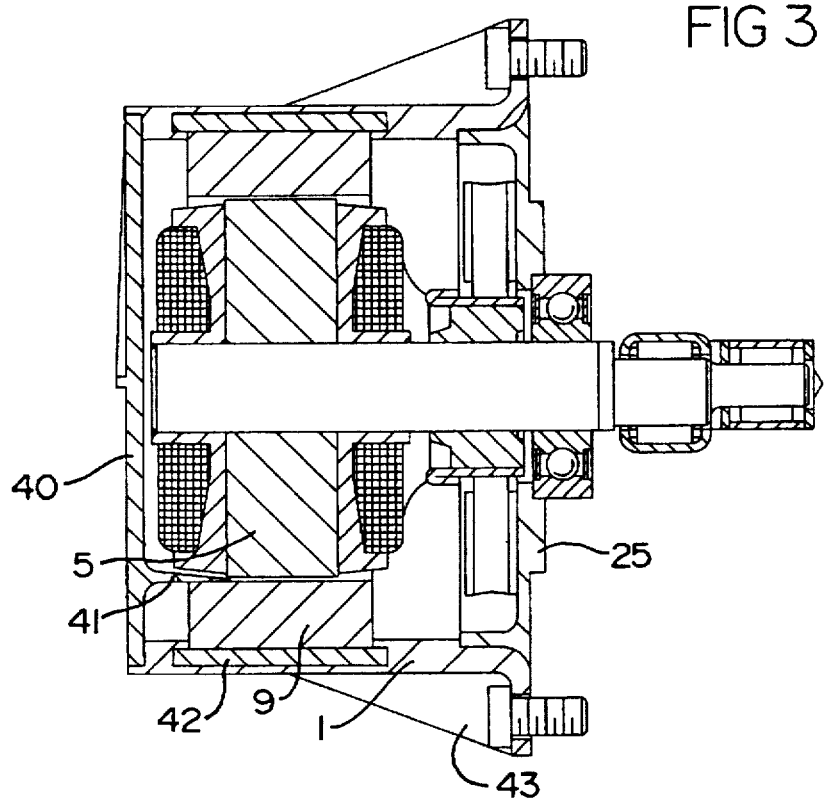
FIGS. 3 and 4 are alternative embodiments to the motor housing of FIG. 1.
Figure 4:
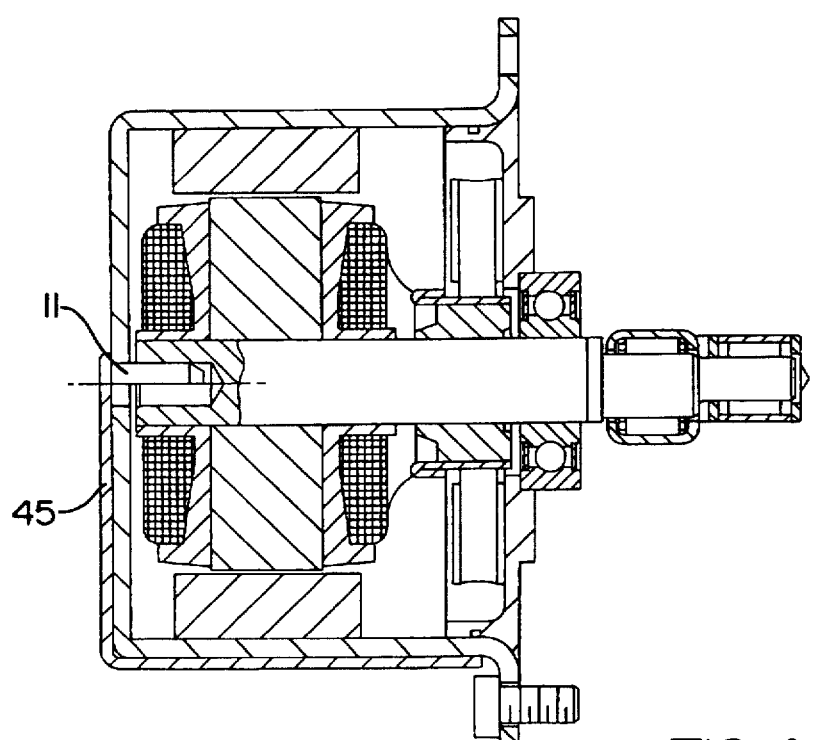

The FIGS. 3 and 4 correspond essentially to the embodiment of FIG. 1, but with the following differences. In FIG. 3 the motor housing 1 is formed by a cylinder one side of which is closed by the bearing plate 25, while the other is closed by a cover 40. The cylindrical part of the motor housing is made of plastic material and contains a metal ring 42 which provides for the magnetic circuit of the permanent magnets 9 being realized. Supporting walls 43 are foreseen in order to guarantee a sufficient stiffness of the motor housing 1.

Cover 40 is provided with a tab 41 positioning itself between rotor 5 and permanent magnets 9 when the cover is put on.

The tab 41 functions as a transit security mechanism. After having mounted motor housing 1 onto the pump housing 2, which is not represented in this Figure, the cover 40 with tab 41 is removed and replaced by a cover without tab 41.

The embodiment according to FIG. 4 discloses a bracket 45 provided with pin 11. On the one hand, the bow with the pin 11 functions as transit security mechanism, i.e. it can be removed after having mounted the motor housing and the pump housing. On the other hand, it can assume also the function of an accessory bearing 10, as described above.

Figure 5:
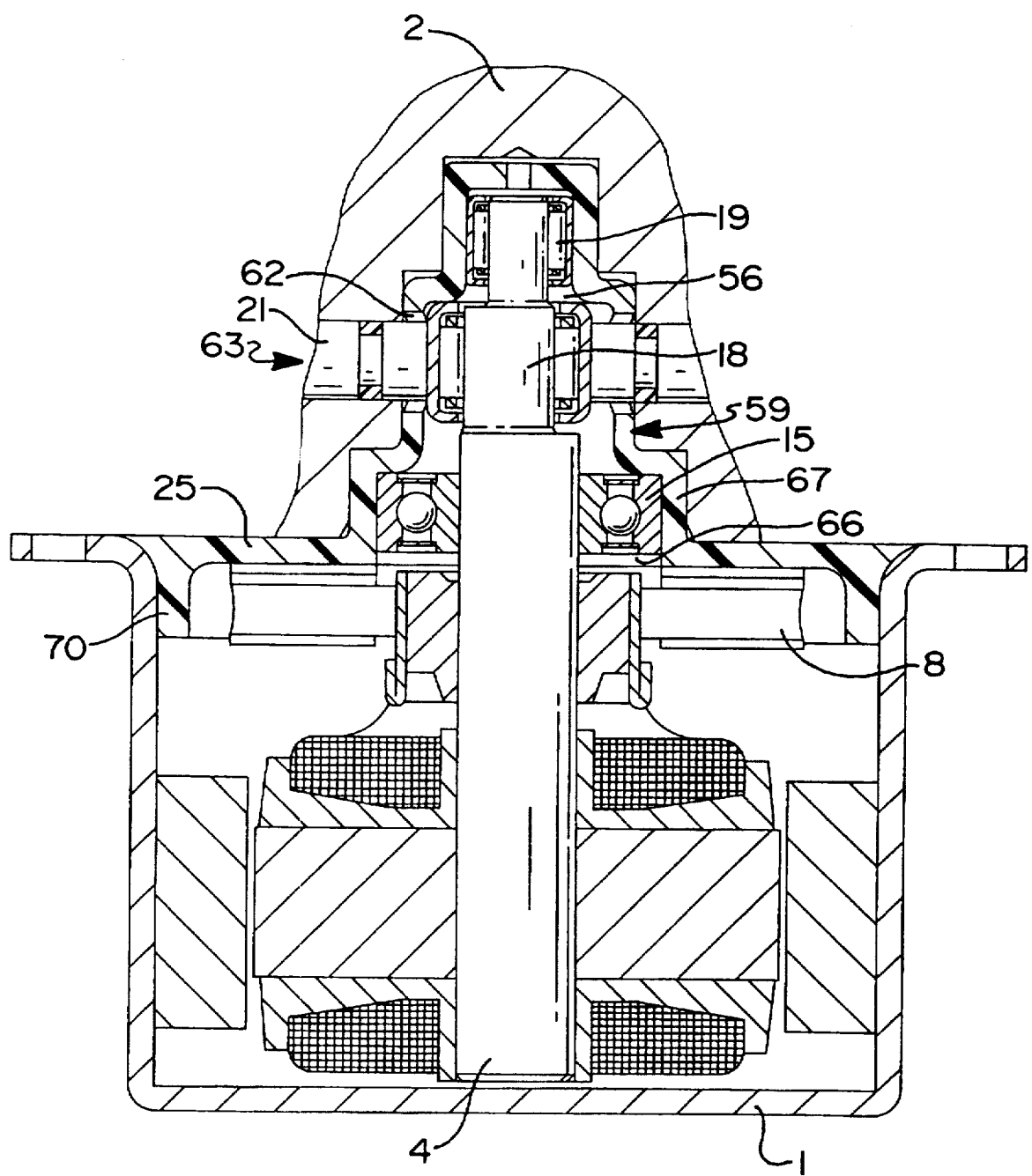
FIG. 5 is a longitudinal cross section of still a further embodiment of the electric motor of the present invention.

FIG. 5 shows a longitudinal section of the electric motor as another embodiment of the present invention, in which the stator 1, forming the housing, is flanged to a pump housing 2. Pump housing 2 accommodates a double-suction radial piston pump 63 generating the pressure for a slip-controlled brake system. Between pump housing 2 and the stator 3 formed as housing bowl, there is a cage-type supporting housing 59 enclosing the two bearings 15, 19, shaft 4 and bearing plate 25 accommodating the brushes 8 and further electrical components. The supporting housing 59 is protected against corrosion and lightweight, because it is made of an injection molded plastic part in order to achieve an electric insulation of the carrier plate and a sealing of stator 1 with regard to pump housing 2. In the present embodiment, the bowl-shaped housing of stator 1 is executed as a deep-drawn sheet metal part and builds a tight protecting cap as well as a magnetic circuit, the magnets being inserted or glued into stator 1. Stator 1 is flanged to pump housing 2 by means of locking screws. A form-locking fastening of stator 1 to pump housing 2 is also possible. The supporting element 59 is provided as a disc-shaped carrier plate in the area pointing towards the stator 1 and clamped between pump housing 2 and flange of stator 1.

The outer contour of this carrier plate are on the supporting element 59 is adapted to the transition radius on the flange of the bowl-shaped stator 1 so that the disc-shaped area of the supporting housing 59 is provided with a transition area executed as collar 70 for reasons of centering. The shaft 4 of the rotor is provided with a eccentric 18 between the two bearings 15 and 19 which is equipped with a needle bearing in order to reduce the friction between the radial piston pump in the pump housing 2 and the electric motor.

The diametrically arranged transversal bores 62 of the supporting housing 59 in the area of the blind-end bore 56 are thus on the same level as eccentric 18, so that, after having mounted the electric motor and the supporting housing 59 in the pump housing 2, the pressure generating elements 21 of the piston pump are inserted from the outside into the pump cylinders of the pump housing 2, arranged radially towards shaft 4, until they abut in a (permanently) guided manner on the needle bearing of eccentric 18.

The advantage of the transversal bores 62 is that they exclude an unintentional removal (lose locking screws) of the electric motor from pump housing 2 since the rigid connection between supporting housing 59 and motor shaft achieved by means of bearing 15, permits a maximum change of the axial position which corresponds only to the difference between the diameters of the pump pistons (pressure generating elements 21) and the transversal bores 62. The pump bearing 19 arranged at the shaft journal is a needle bearing, too, and is pressed into the blind-end bore 56 of the supporting housing 59 or retained by spray-coating with plastic material. It assumes the function of a guide bearing (movable bearing) while the forces of the main bearing are introduced from the motor via the supporting housing into pump housing 2 by means of the bearing 15 (fixed bearing) which is formed as a ball bearing.

The arrangement of a light, small and closed supporting bearing 59 favors the sound insulation or reduces the transmission of structure-borne noise between pump and electric motor and permits a functional test (test run) of the electric motor before being mounted in pump housing 2.

Figure 6:
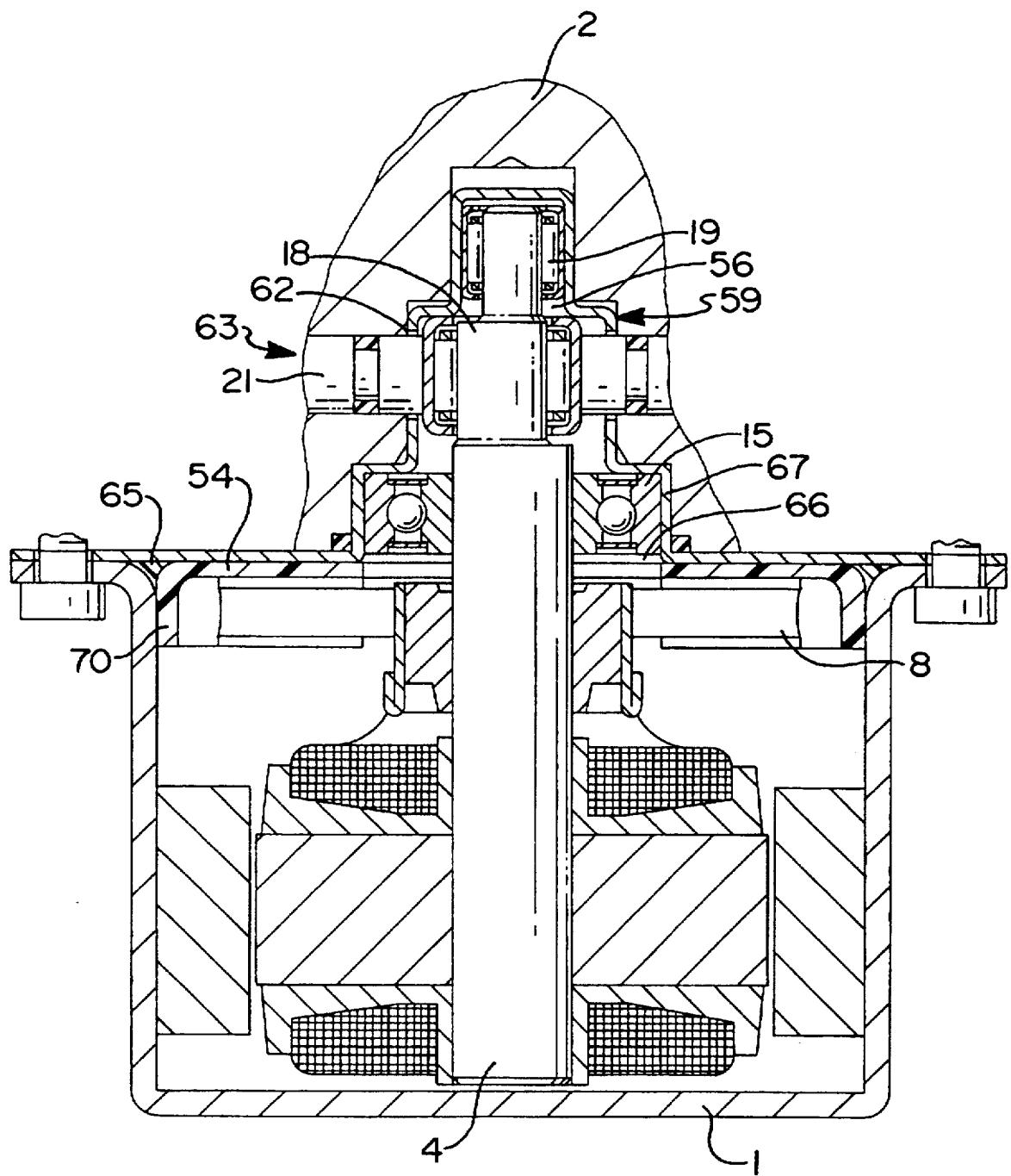
FIG. 6 depicts a preferred embodiment of the housing of the electric motor of the present invention.

In deviation from FIG. 5, FIG. 6 shows the supporting housing 59 as deep-drawn metal part which, together with the stator 1, forms a fastening flange with its disc-shaped contact area. The essentially disc-formed carrier plate 54 is retained as separate plastic part between the flange of stator 1 and the disc area of the supporting housing 59. The metal supporting housing 59 can be welded or, as shown in the configuration, screwed with the metal stator 1, a sealing inserted between the stator 1, the carrier plate 54 and the supporting housing 59 preventing the penetration of humidity into the electric motor. A collar 70 on the carrier plate 54 is adapted to the form of the stator housing so that a simple fastening of the carrier plate 54 is guaranteed which, in the present example, fixes the carrier plate 54 in stator 1 by operative connection. A form-locking fixing can be realized, too, by means of a simple injection molding or deep-drawing procedure.

Figure 7:
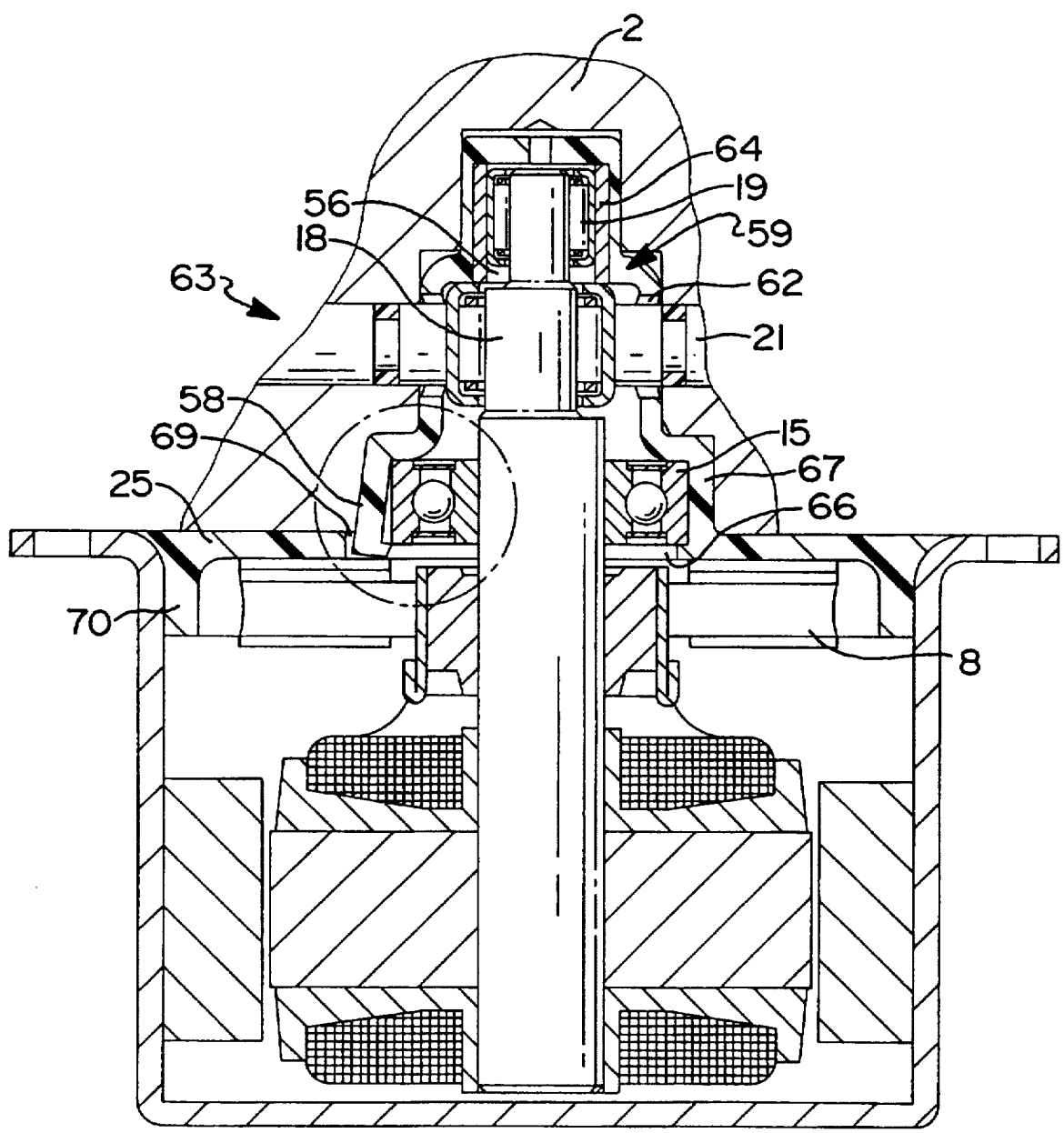
FIG. 7 depicts still another preferred embodiment of the support housing of the electric motor of the present invention.

FIG. 7 shows another preferred embodiment of the supporting housing 59 as injected plastic protection cover or plastic cage provided with a metal sleeve 64 inserted in the injection mold and spray-coated. Thus in the areas where the supporting housing 59 has a critical strength, the wall thickness can be relatively small without having to accept the risk of a defect of the supporting housing 59. A convenient measure is the fixing of the main bearing 15 in the supporting housing 59 by means of snap-in hooks 58 which can be produced in a relatively simple way in an injection mold with suitable recesses 69 and a suitable shaping of the supporting housing 59. The recesses 69 and snap-in hooks 58 take advantage of the considerable elastic properties of thin-walled plastic parts which can be also applied to parts made of thin sheet metal. A direct spray-coating of the bearings 15, 19 with the plastic material during the manufacturing of the supporting housing 59 is a further suitable fastening means so that a supporting housing 59 premounted on stator 1 can be inserted and fastened in the stepped bore of the pump housing 2 as an operative motor assembly, the outer contour of the supporting housing 59 being adaptable to the stepped bore of the pump housing 59 in a relatively simple manner both in injection molds and in deep-drawing dies.

Concluding, the present invention is distinguished by the features, that both bearings 15, 19 and the needle bearing of the eccentric 18 are accommodated by a supporting housing 59 which is closed with regard to construction and effect, receives the bearing forces and forms a closed, operative unit with the motor. This supporting housing can be configurated as injection-molded plastic part and can replace the previous separate arrangement of the carrier plate 54. Alternatively the supporting housing 59 can be made of metal as a deep drawn part which, in conformity with the demands of automation, is connected tightly with the stator housing, e.g. by welding it, or prevents the penetration of humidity into the motor by means of an inserted seal when using a detachable coupling method. In this configuration an insulating carrier plate 54 for the accommodation of the brushes 8 abuts between stator 1 and supporting housing 59.

Particularly critical and highly stressed areas of the supporting housing 59 can be improved with regard to their admissible stress by spray-coating the plastic material around inserted metal sleeves. A simple axial fixing of the bearings 15, 19 can be realized by inserting them into the injection mold and spray-coating them with plastic material. Even a fixing by means of snap-in hooks 58 which due to their shape snap in before the relative bearing when mounting the motor in pump housing 2, permits a simple and inexpensive fixing and adjusting of the bearing. Since the pump pistons are mounted only after the electric motor in pump housing 2, they lock to the supporting housing 59 in the area of the transversal bores 62 building a retaining device for the stator 1 on pump housing 2.

Figure 8:
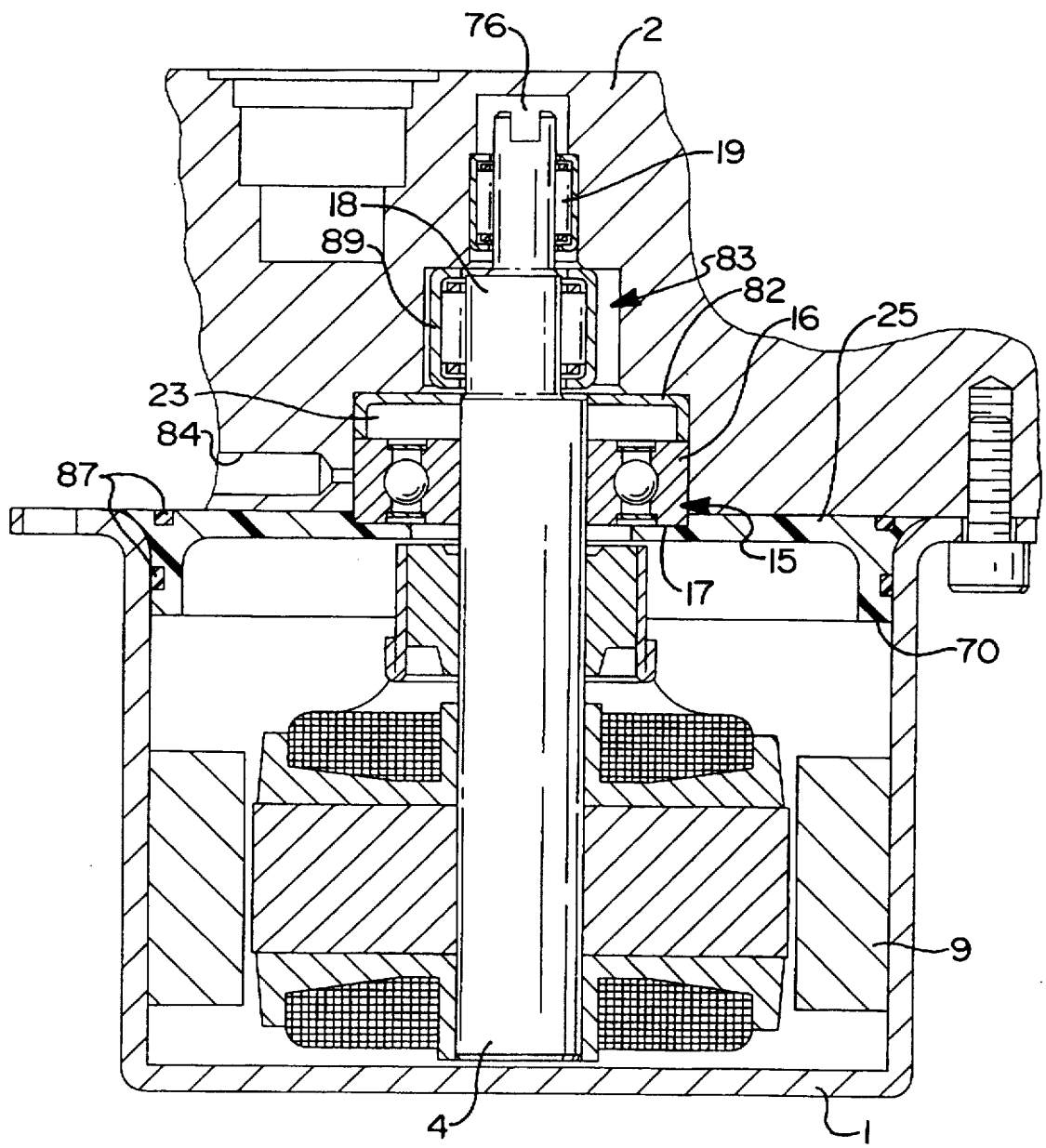
FIG. 8 is a cross sectional view of still yet a further embodiment of the electric motor of the present invention.

In order to illustrate the present invention, FIG. 8 shows a cross-sectional view of the electric motor on a larger scale, the housing of which forming stator 1 is flanged to a pump housing 2. Pump housing 2 accommodates a double-suction radial piston pump and electrohydraulic valves for the operation of a slip-controlled brake system which in the cross-sectional view cannot be seen explicitly. Between the pump housing 2 and the stator 1 shaped as a housing cup there is a carrier plate 25 or an bearing plate 25 suitable for the accommodation of brushes and electrical connection components. The bearing plate 25 is provided with gaskets 87 in order to seal the stator 1 with regard to pump housing 2 which seal the bearing plate 25 with regard to pump housing 2 and the housing of stator 1. The gaskets 87 are either injected or inserted into the bearing plate 25. The bowl-shaped housing of stator 1 is configured as a deep-drawn part made of thin sheet metal and builds a tight protection cap as well as the magnetic circuit, the magnets 9 being either inserted or glued into the stator 1.

Stator 1 is flanged to the pump housing 2 by means of locking screws extending through the bearing plate 25. A form-locking fastening of the stator 1 to pump housing 2 is also possible. In order to facilitate the mounting, the magnets 9 are magnetized only after having flanged the electric motor to pump housing 2. The rotor is provided with bearing plate 25, main bearing (bearing 15), spacer disc 82 and needle bearing 89 so that the assembly is ready for operation. Main bearing 15 and needle bearing 89 are provided with a force fit on shaft 4 or eccentric 18. The pump bearing (bearing 19) shows a force fit in the blind-end bore 76 (third step) so that the bearing 19 assumes the function of a movable bearing and bearing 15 is the fixed bearing.

The premounted rotor unit can be inserted into bore step 23 under the effect of low insertion forces, the length of the spacer disc 82 being in nearly complete abutment with bore step 23 and the outer bearing ring 16. The outer bearing ring 16 abuts contemporarily on the ring-shaped recess 17 in the bearing plate 25. Recess 17 and collar 70 build a mounting and fixing device for the main bearing 15 and the housing bowl of stator 1 which, together with the magnets 19, is slipped over the stator and screwed. The predominant portion of the bearing forces is taken up by the main bearing (bearing 15). After having inserted the rotor assembly, consisting of bearing 15, needle bearing 89, spacer disc 82 and carrier plate 25, as premounted assembly into the stepped bore 83 in pump housing 2 and having it fixed with locking screws, glue is injected into the stepped bore 23 in order to prevent the outer bearing ring 16 of bearing 15 from torsion. This is done by a bore 84 extending through the pump housing 2 up to the stepped bore 23 so that bearing ring 16 is fixed securely due to the applied glue. By this fastening means, the diameter of the stepped bore 83 can have large tolerances, permitting low pressing forces for bearing 15. The desired position of bearing 15 as well as the fixing of the other components connected with shaft 4 is guaranteed by the bearing plate 25 acting as mounting and fixing device and the spacer disc 82.

Figure 9:
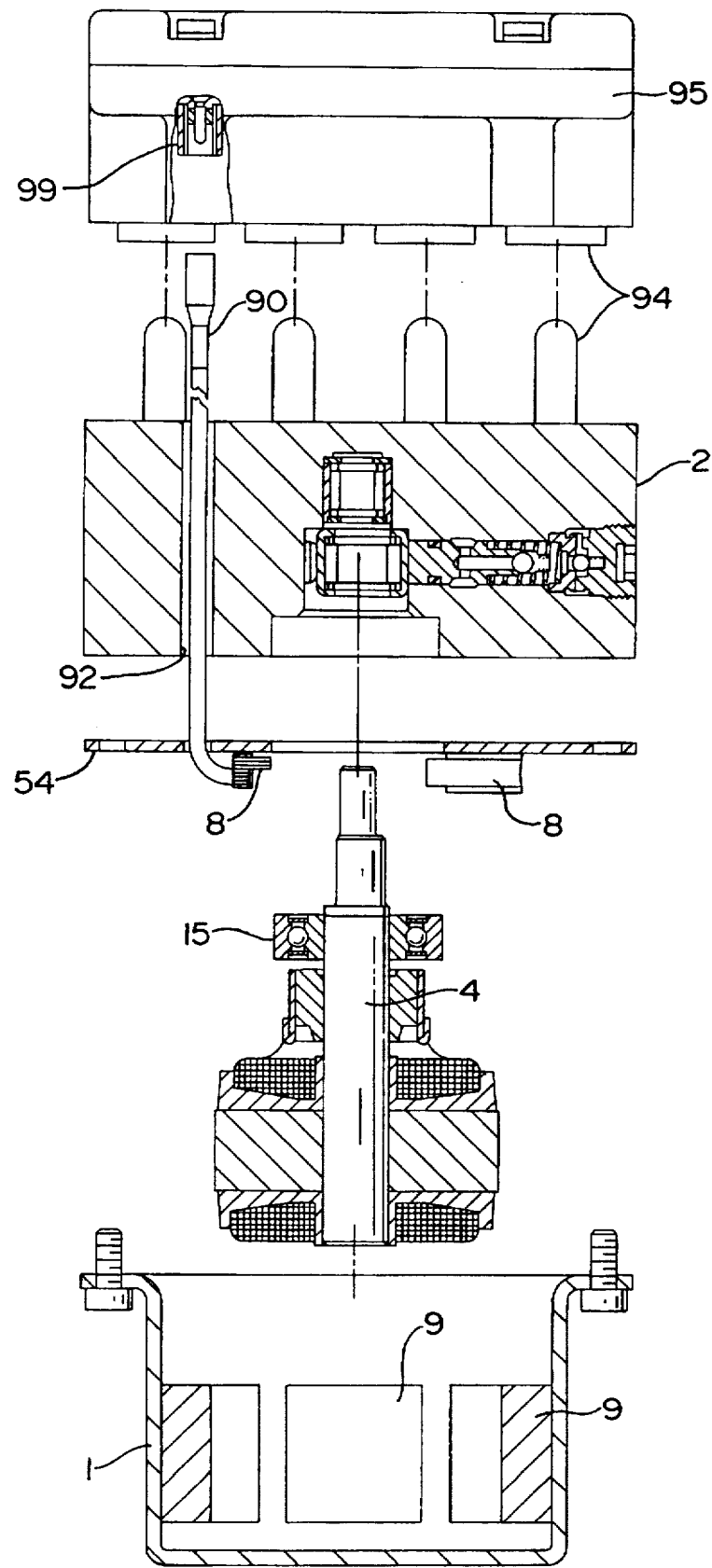
FIG. 9 is an exploded view of the motor-pump assembly of the present invention.

FIG. 9 shows a further preferred embodiment of the present invention in an exploded view of an electric motor represented in a longitudinal section, the housing 1 of which forming stator 3 is flanged to a pump housing 2. Pump housing 2 accommodates a double-suction radial piston pump 63 and electro-hydraulic valves 93 for the operation of a slip-controlled brake system. Between pump housing 2 and stator 1 shaped as a housing bowl, there is a carrier plate 54 accommodating the brushes 8 and the electric connection component 90. The connection component, illustrated as loom of cables, is guided in a sealed manner inside the through-bore 92 in the pump housing 2 and connected, by means of a plug-in connection, to a control electronics unit which accommodates as well the coils of the electrohydraulic valves 94. The electrical connection between the electric motor and the control electronics unit 95 is thus realized within the whole assembly. The carrier plate 54 is made of a sealing material in order to seal stator 1 with regard to the accommodating element 2. In this embodiment of the present invention the bowl-shaped housing of stator 1 is a deep-drawn part made of thin sheet metal which forms a tight protective cap and the magnetic circuit, the magnets being inserted or glued into the stator. Stator 1 is flanged to pump housing 2 by means of locking screws which extend through the carrier plate 4 as well. It is also possible to fasten stator 1 with pump housing 2 in a form-locking manner.

Figure 10:
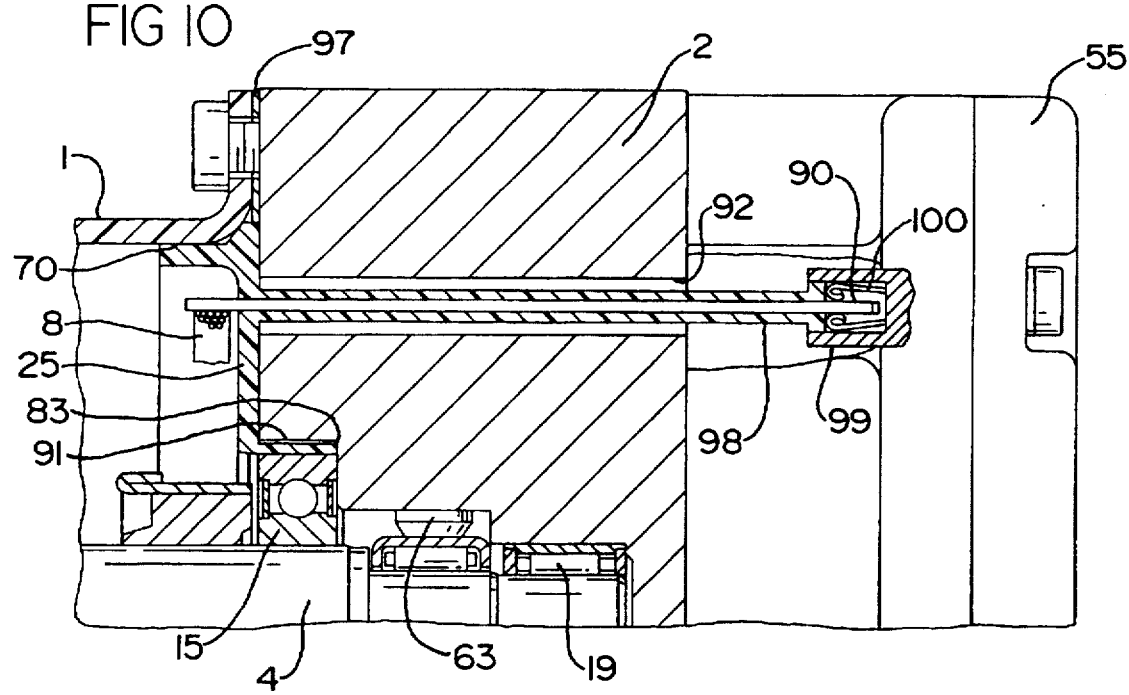
FIG. 10 is a partial cross-sectional view highlighting the carrier plate element of the present invention.

FIG. 10 shows the carrier plate as machined plastic part which guarantees the sealing of the motor housing at the outer collar either by means of an extruded sealing or a gasket 97 inserted between stator 1 and pump housing 2. The collar 70 on carrier plate 54 is adapted to the form of the housing flange so that a simple orientation of the carrier plate 4 is ensured.

A further distinctive feature with regard to the embodiments of the present invention described above is, that in FIG. 10 the electric connection component 90 is extruded with the material of the carrier plate 54 in such a way that a projection 98 of the carrier plate 54 projects over the through-bore 92. The projection 98 is in contact with the plug 99 of a control electronics unit 95 attached to the electrohydraulic valves 94.

In the example, the electric connection component 90 is configured as contact lug which is connected with the control system 95 by means of contact springs 100. In this case, the projection 98 builds a tight and snap-in assembly with the plug 99.

For silencing and for tolerance compensation, the carrier plate 54 is provided with a collar 91 close to the pump housing 2 which encloses the main bearing 15 fastened on shaft 1 at the outer diameter is inserted is inserted in the stepped bore 83 in pump housing 2 with main bearing 15.

Figure 11:
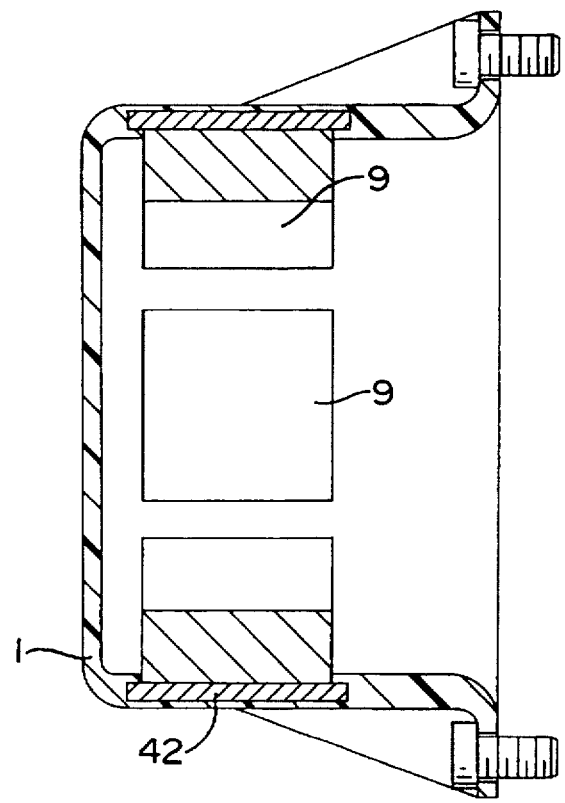
FIG. 11 is a cross sectional view of the preferred embodiment of the stator for the electric motor of the present invention.

FIG. 11 shows the longitudinal section another preferred embodiment of stator 1 as injection-molded plastic protection cap in which a metal ring 42 is retained together with the magnets 9 in stator 1 in order to build the magnetic circuit.

Concluding, the invention illustrated in the FIGS. 9 to 11 offers the advantages that the electric connection component 90 builds an integral assembly of the whole assembly which does not have to be sealed peripherally and fastened any more, that a possibly direct and thus short wiring of the electric motor with the power supply (control electronics unit 95) is ensured, that the prerequisite for a soldering or welding of the electric connection component 90 in conformity with the demands of automation is given among other things by the fastening of the brushes, the side of the electric connection component 90 close to the power supply being provided with a simple plug system. The electric connection component 90 can thus be realized by means of a wire spray-coated with the carrier material or a spray-coated punched grid which guarantees an operational connection between the electric motor and the power supply by means of the desired stability, tightness and electric insulation.

There are further advantages from the short bearing of the rotor in a bowl-shaped bore 83 of the pump housing 2, presenting also the electrohydraulic valves 94 and the control electronics unit 95 of a slip-controlled brake system. A particularly suitable method is the arrangement of the carrier plate 54 between the pump housing 2 and the stator housing 1, the carrier plate 54 sealing either both joined parts with an extruded gasket or being produced from hardboard which besides accommodating the brush systems and the electric connection component 90 assumes also a sealing function. The bearing 15 of shaft 4 can be guided in a favorable manner by means of a suitable projection 91 on the carrier plate 54 thus favoring a tolerance compensation and a silencing of shaft 4.

Figure 12:
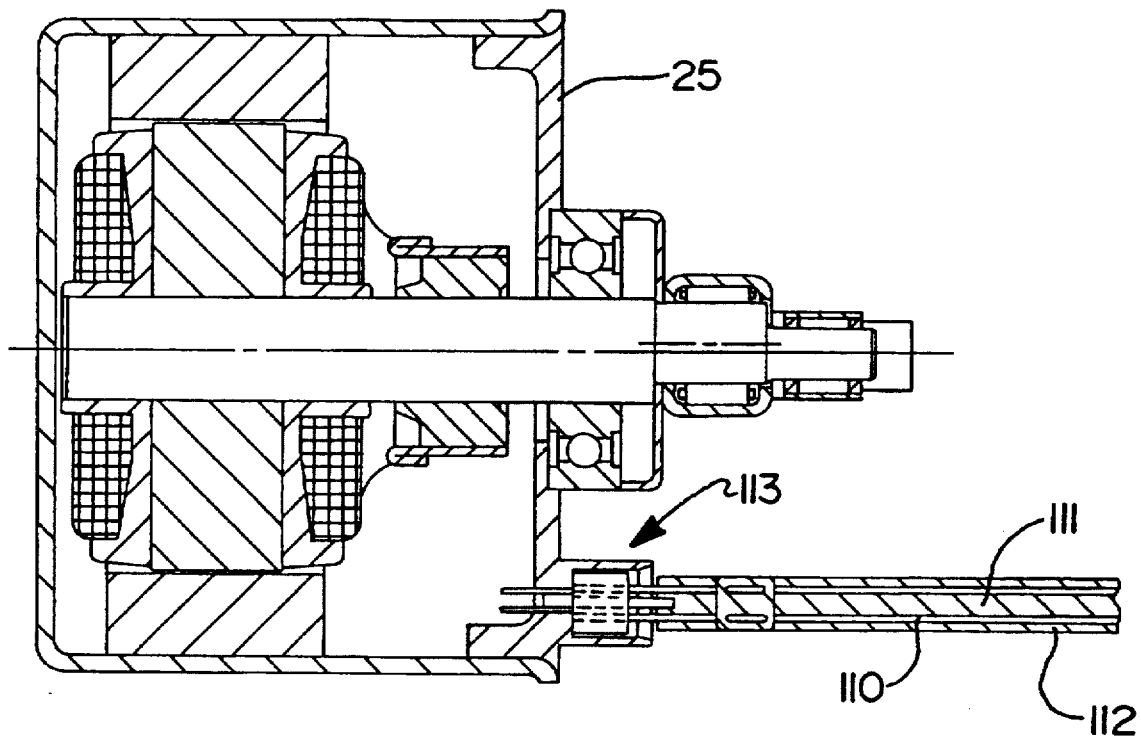
FIG. 12 is a partial cross sectional view of the motor of the present invention depicting an alternative embodiment of the cable bushing for the motor of the present invention.

FIG. 12 illustrates yet another embodiment of the cable bushing.

The cables 110 of the power lead are inserted into a punched grid 111 spray-coated with plastic material 112. The plastic material is extruded on the housing of the control electronics unit 95 so that the housing of the control electronics unit 95 and the cable bushing form an integral component. A plug is foreseen at the end of the cable bushing close to the motor. At the same time the bearing plate 25 is provided with a mating plug being integral part of the bearing plate 25. When the parts are assembled, the electric connection between the electric motor and the control electronics unit 95 is automatically realized.

The cable bushing can be foreseen also as single part, in modification of the embodiment according to FIG. 12, provided with a plug at either end. One plug contacts the plug on the electric motor, the other plug contacts a plug on the control electronics unit 95. This single configuration offer better combination possibilities so that different types of the motor-pump-assembly can be produced.

The cable bushing itself can also be made of two parts, each part presenting one lead. The two parts are symmetrical to each other and can be put together to build one cable bushing. For this reason the single elements are provided with matching noses or recesses.

We claim:

1. An electric motor-pump assembly including an electric motor having a motor housing including a bearing plate retaining a main bearing, the assembly also including a pump housing with an abutment surface into which a bore with first, second, and third steps terminates, the first step of which is adjacent to the abutment surface and accommodates the main bearing and supports it radially, said pump housing including bores which accommodate pump pistons and terminate into the second step, the third step accommodating a pump bearing and supporting said pump bearing radially, the electric motor including a rotor supported by the main and the pump bearing, the rotor including an eccentric for driving the pump pistons, wherein the motor housing and the pump housing are coupled in such a way that the bearing plate abuts the abutment surface of the pump housing.

2. The assembly according to claim 1, wherein there is one accessory bearing arranged in the housing of the electric motor which supports the end of the rotor shaft close to the rotor.

3. The assembly according to claim 1, wherein there is one accessory bearing arranged in the housing of the electric motor which supports the end of the rotor shaft close to the rotor.

4. The assembly according to claim 3, wherein the accessory bearing consists of a barrel-shaped journal being arranged in the bore of the rotor shaft.

5. The assembly according to claim 4, wherein the barrel-shaped journal is fastened to the motor housing by means of a rivet and that the bore has a blind end extending in axial direction in the rotor shaft and opening towards one frontal end of the rotor shaft.

6. The assembly according to claim 1, wherein the pump and main bearing are configured as rolling bearings.

7. The assembly according to claim 1, wherein the main bearing is provided with an outer bearing ring the length of which is inserted in part in a recess on the motor housing, so that the bearing ring projects from the housing or the bearing plate and that in the pump housing is foreseen a first step in which can be inserted the projecting part of the bearing ring.

8. The assembly according to claim 7, wherein the bearing plate contains an opening the inner diameter of which is smaller than the outer diameter of the main bearing and that the bearing plate is arranged between the main bearing and the housing of the electric motor.

9. The assembly according to claim 8, wherein the bearing plate in the area of the opening is provided with a recess on which the frontal surface of the outer bearing ring of the main bearing abuts.

10. The assembly according to claim 8, further including a spacer disc abutting the frontal surface of the outer bearing ring remote from the bearing plate, which contacts the frontal surface of a stepped bore in the pump housing remote from the main bearing.

11. The assembly according to claim 10, wherein the spacer disc with a collar provided on the outer perimeter contacts the outer bearing ring on the main bearing and that the inner diameter of the spacer disc corresponds approximately to the shaft diameter.

12. The assembly according to claim 1, further including a bore leading in perimetral direction to the stepped bore in the pump housing, the bore getting overlapped by the outer bearing ring.

13. The assembly according to claim 1, wherein the motor housing is provided with a bulge projecting to the outside and opening into the interior of the motor housing, the second bearing being inserted in the corresponding recess and the bulge being insertable into the first step of the pump housing.

14. The assembly according to claim 1, further including a supporting housing fixing the pump bearing which moves on the shaft in a blind-end bore of the supporting housing and accommodating the main bearing on the shaft spaced from the pump housing, thereby closing a force flow between the shaft bearing in the supporting housing and the motor housing.

15. The assembly according to claim 7, wherein the supporting housing is provided with an opening the inner diameter of which is equal or somewhat smaller than the outer diameter of the main bearing.

16. The assembly according to claim 14, wherein the supporting housing is equipped with a carrier plate with electric components.

17. The assembly according to claim 16, wherein brushes are fastened on the carrier plate.

18. The assembly according to claim 16, wherein the supporting housing consists of an injection-molded plastic part with thin walls and shaped like a cage, which builds a homogenous assembly with the bearing plate.

19. The assembly according to claim 18, wherein the retaining area of the bearings metal sleeves are inserted into the supporting housing.

20. The assembly according to claim 14, wherein the supporting housing consists of a part made of thin sheet metal in a deep drawing or pressing procedure and is clamped in a sealed manner between the motor housing and the pump housing with the insulated carrier plate.

21. The assembly according to claim 14, wherein the retaining area is equipped with snap-in hooks in order to accommodate the main bearing, for which recesses are foreseen in the supporting housing.

22. The assembly according to claim 1, wherein the supporting housing is provided with a sealing at the contact points between the motor housing and the pump housing.

23. The assembly according to claim 1, wherein the supporting housing is provided with a projection enclosing the main bearing at the outer diameter.

24. The assembly according to claim 1, wherein one end of the shaft is free from bearing forces, that the bearing of the shaft is arranged in the pump housing and that a carrier plate is clamped between the motor housing and the pump housing.

25. The assembly according to claim 24, wherein the carrier plate provides for a sealing at the contact points between the electric motor housing and the pump housing.

26. The assembly according to claim 24, wherein the pump housing is provided with a through-bore accommodating an electric connection component.

27. The assembly according to claim 26, wherein the electric connection component of the electric motor is connected to a control electronics unit acting as power supply.

* * * * *